(12) United States Patent  (10) Patent No.: US 7,749,634 B2
Chapman et al.  (45) Date of Patent: *Jul. 6, 2010

(54) FLOW CONTROL FOR MULTIPLE STACKS

(75) Inventors: I Daryl Chapman, Victor, NY (US); Jeff A Rock, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/104,752

(22) Filed: Apr. 17, 2008

(65) Prior Publication Data

US 2008/0233461 A1  Sep. 25, 2008

Related U.S. Application Data

(62) Division of application No. 10/413,266, filed on Apr. 14, 2003, now Pat. No. 7,396,601.

(51) Int. Cl.
    *H01M 8/00* (2006.01)
    *H01M 8/04* (2006.01)
(52) U.S. Cl. .......................................... 429/34; 429/12
(58) Field of Classification Search .................. 429/34, 429/38, 39, 30, 32, 40, 46
    See application file for complete search history.

(56) References Cited

U.S. PATENT DOCUMENTS

| 5,484,666 | A | | 1/1996 | Gibb et al. |
| 5,514,487 | A | * | 5/1996 | Washington et al. .......... 429/39 |
| 5,547,777 | A | | 8/1996 | Richards |
| 5,707,755 | A | | 1/1998 | Grot |
| 5,789,091 | A | | 8/1998 | Wozniczka et al. |
| 6,007,933 | A | * | 12/1999 | Jones .......................... 429/38 |
| 6,015,633 | A | * | 1/2000 | Carlstrom et al. ............. 429/13 |

(Continued)

FOREIGN PATENT DOCUMENTS

EP  0 444 383 A1  9/1991

(Continued)

OTHER PUBLICATIONS

Technical Bulletin, Ballard Material Products Inc. (2006).

*Primary Examiner*—Jerry Lorengo
*Assistant Examiner*—Jared Wood
(74) *Attorney, Agent, or Firm*—Harness, Dickey & Pierce, P.L.C.

(57) ABSTRACT

A fuel cell comprises an electrode plate having a flow field formed therein and a proton exchange membrane. A compressible permeable diffusion media is disposed adjacent the electrode plate. The diffusion media is compressed against the electrode plate so that a portion of the media intrudes into the flow field. A fuel cell stack can be made by compressing a plurality these fuel cells together. The fuel cell stack is compressed so that the diffusion media in each fuel cell is compressed against the adjacent electrode plate with a portion of the media intruding into the flow field in the adjacent electrode plate. The compression of the fuel cell stack can be adjusted so that a magnitude of intrusion of the diffusion media into the flow channels is adjusted and a pressure drop of a predetermined magnitude occurs across the fuel cell stack at a desired operational state.

23 Claims, 3 Drawing Sheets

U.S. PATENT DOCUMENTS

| | | |
|---|---|---|
| 6,040,072 A | 3/2000 | Murphy et al. |
| 6,936,362 B2 | 8/2005 | Chapman et al. |
| 2002/0051901 A1 | 5/2002 | Zuber et al. |
| 2004/0023100 A1 | 2/2004 | Boff et al. |

FOREIGN PATENT DOCUMENTS

| | | |
|---|---|---|
| EP | 0 981 174 A2 | 2/2000 |
| EP | 0 981 175 A2 | 2/2000 |
| EP | 1184925 A2 | 8/2001 |
| JP | 61-225779 | 10/1986 |
| JP | 8-88018 | 4/1996 |
| JP | 11-97054 | 4/1999 |

* cited by examiner

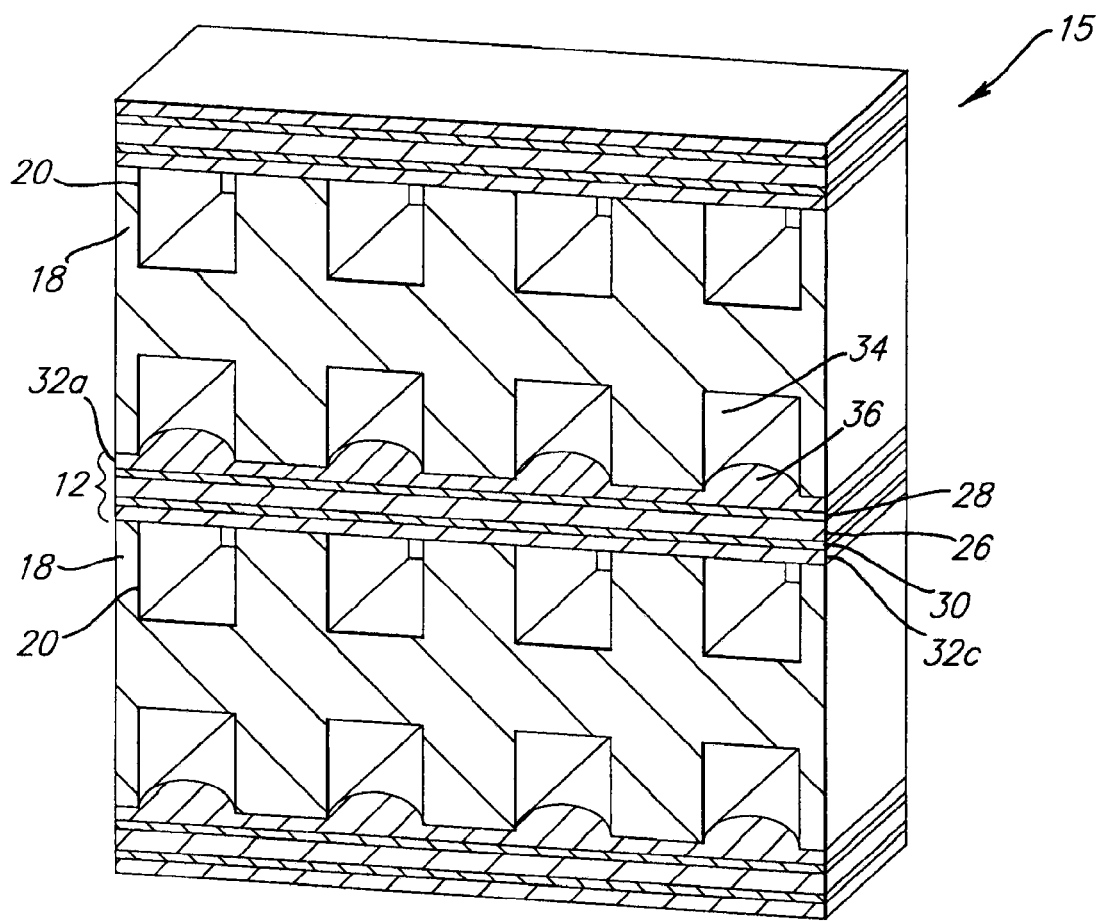
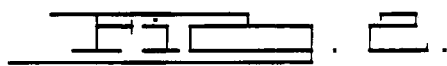
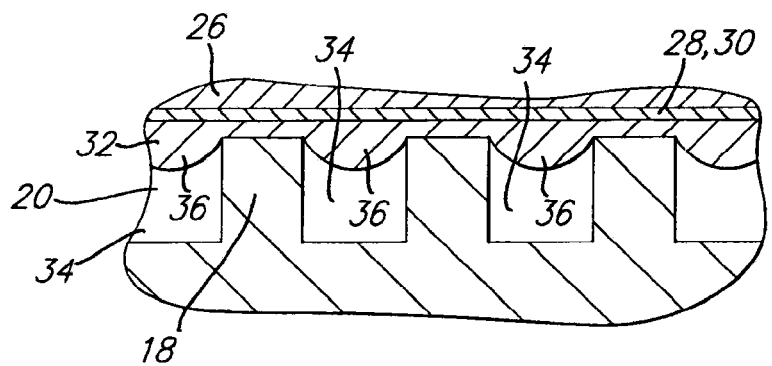
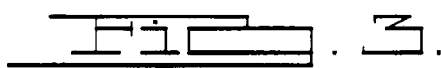

FLOW CONTROL FOR MULTIPLE STACKS

CROSS-REFERENCE TO RELATED APPLICATIONS

This application is a divisional of U.S. patent application Ser. No. 10/413,266 filed on Apr. 14, 2003, the disclosure of which is incorporated herein by reference.

FIELD OF THE INVENTION

The present invention relates to fuel cells and more particularly to controlling the flow of reactants through a fuel cell.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive non-electrically conductive, solid polymer electrolyte membrane having the anode catalyst on one face and the cathode catalyst on the opposite face. The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such a perfluoronated sulfonic acid. The anode/cathode typically comprises finely divided catalytic particles, which are often supported on carbon particles, and mixed with a proton conductive resin. The catalytic particles are typically costly precious metal particles. As such, these MEAs are relatively expensive to manufacture and require certain conditions, including proper water management and humidification and control of catalyst fouling constituents such as carbon monoxide (CO), for effective operation.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

Interposed between the reactant flow fields and the MEA is a diffusion media serving several functions. One of these functions is the diffusion of reactant gases therethrough for reacting with the respective catalyst layer. Another is to diffuse reaction products, such as water, across the fuel cell. In order to properly perform these functions, the diffusion media must be sufficiently porous while maintaining sufficient strength. Strength is required to prevent the diffusion media from tearing when assembled within the fuel cell stack.

The flow fields are carefully sized so that at a certain flow rate of a reactant, a specified pressure drop between the flow field inlet and the flow field outlet is obtained. At higher flow rates, a higher pressure drop is obtained while at lower flow rates, a lower pressure drop is obtained. However, the pressure drop experienced between the flow field inlet and the flow field outlet may vary from the designed pressure drop. Such variations can be caused by variations in the manufacturing of the fuel cell stacks and/or in the tolerances of the components used in the fuel cell stack. Such variations from the designed pressure drop can be detrimental to the operation and/or performance. Therefore, it is desirable to provide a fuel cell and/or fuel cell stack having an improved flow field design.

SUMMARY OF THE INVENTION

The present invention provides a fuel cell that has a pressure drop that can be varied. A compressible diffusion media for implementation with a fuel cell is utilized. The compressible nature of the diffusion media enables the pressure drop across the fuel cell to be adjusted so that a desired operation of the fuel cell can be achieved.

A fuel cell according to the present invention has an electrode plate with a flow field formed therein and a proton exchange membrane. A compressible, fluid-permeable diffusion media is disposed adjacent to the electrode plate. The media is compressed against the electrode plate so that a portion of the media intrudes into the flow field.

The present invention discloses a method of making an individual fuel cell. The method includes the steps of: (a) positioning a compressible, fluid-permeable diffusion media in between a proton exchange membrane and an electrode plate having a flow field formed therein; and (b) compressing the diffusion media against the electrode plate so that a portion of the media intrudes into the flow field.

The present invention also discloses a method of making a fuel cell stack. The method includes the steps of: (a) positioning a plurality of fuel cells adjacent one another; (b) supplying a feed stream to the plurality of fuel cells; (c) monitoring a pressure drop of the feed stream across the plurality of fuel cells; and (d) adjusting a compression of the plurality of fuel cells so that the pressure drop is of a magnitude substantially equal to at least one of a predetermined range of pressure drops and a predetermined pressure drop.

By the present invention it is possible to compensate for possible variations in the designed pressure drop, it is also possible to control the amount of pressure drop that is experienced so that a relatively customized operation of the fuel cell can be achieved. For example, one pressure drop may be implemented to enhance performance of the fuel cell while a different pressure drop may be implemented to enhance an efficiency of the fuel cell system. Additionally, when a fuel cell stack is connected in parallel with one or more other fuel cell stacks such that they all receive a feed stream from a common header, it is possible to adjust the pressure drops of one or more of the various fuel cell stacks so that the feed stream from the header flows evenly through each of the fuel cell stacks. That is, if one fuel cell stack has a lower pressure drop than other fuel cell stacks that are operated in parallel, a greater portion of the feed stream will flow through the lower pressure drop stack than through the higher pressure drop stacks. Such variation in the portions of the feed stream that flow through the various fuel cell stacks may be controlled or mitigated by implementation of the invention.

Thus, it is possible to control and/or adjust the amount of pressure drop that occurs across the flow fields in the fuel cell and/or fuel cell stack so that specific operational performance can be achieved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a partial perspective cross-sectional view of a portion of a PEM fuel cell stack containing a plurality of the fuel cells of FIG. 1, showing layering including diffusion media;

FIG. 3 is a detailed view of the portion shown in FIG. 2;

DETAILED DESCRIPTION OF THE PREFERRED EMBODIMENT

The following description of the preferred embodiment is merely exemplary in nature and is in no way intended to limit the invention, its application, or uses.

Figure 1:
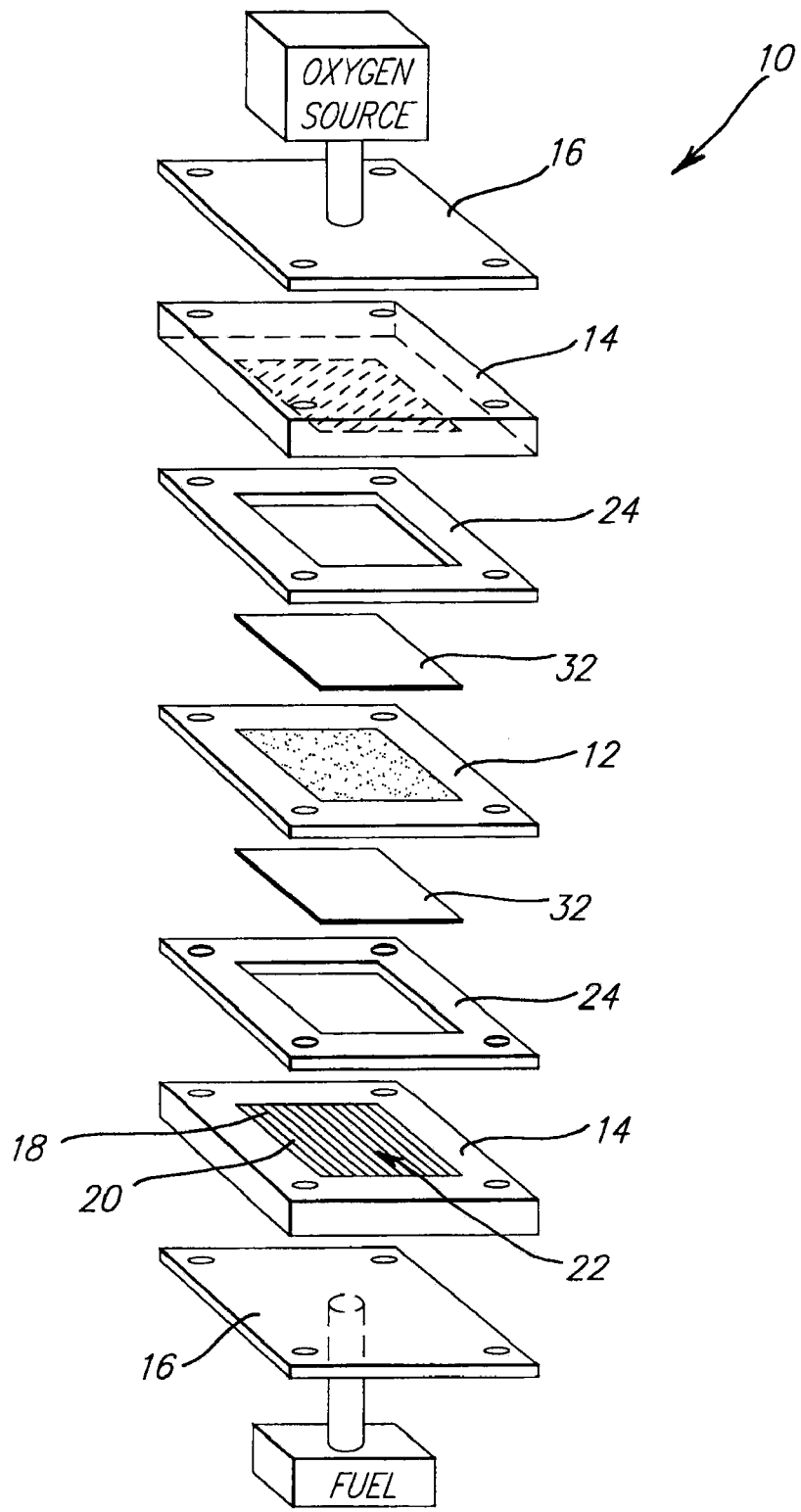
FIG. 1 is an exploded perspective view of a monocell fuel cell according to the principles of the present invention.
Figure 4:
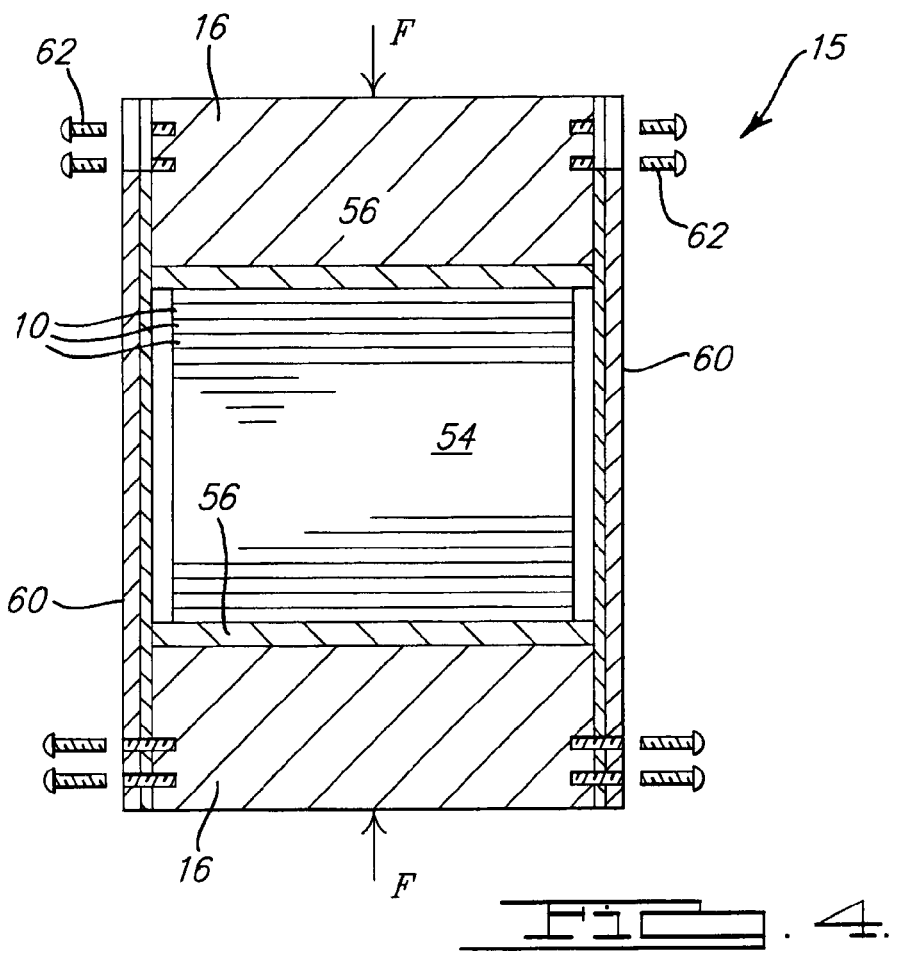
FIG. 4 is a simplified cross-sectional view of a fuel cell stack being compressed according to the principles of the present invention.
Figure 5:
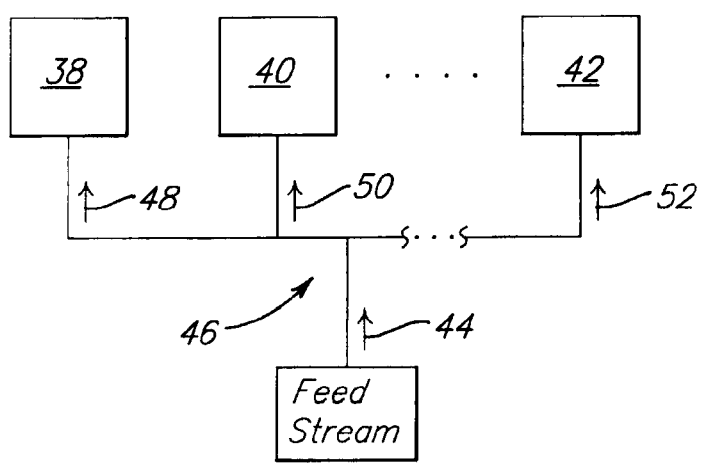
FIG. 5 is a schematic representation of a plurality of fuel cell stacks operating in parallel.

With reference to FIG. 1, a monocell fuel cell 10 is shown having an MEA 12 and a pair of diffusion media 32 sandwiched between a pair of electrically conductive electrode plates 14. It will be appreciated, however, that the present invention, as described hereinbelow, is equally applicable to fuel cell stacks 15 that comprise a plurality of single cells arranged in series and separated from one another by bipolar electrode plates commonly known in the art. Such fuel cell stacks 15 are shown in FIGS. 4 and 5. For brevity, further reference may be made to either the fuel cell stack 15 or to an individual fuel cell 10, however, it should be understood that the discussions and descriptions associated with fuel cell stack 15 are also applicable to individual fuel cells 10 and vice versa and are within the scope of the present invention.

The plates 14 may be formed of carbon, graphite, coated plates or corrosion resistant metals. The MEA 12 and electrode plates 14 are clamped together between end plates 16. The electrode plates 14 each contain a plurality of lands 18 defining a plurality of flow channels 20 that form a flow field 22 for distributing reactant gases (i.e. $H_2$ and $O_2$) to opposing faces of the MEA 12. In the case of a multi-cell fuel cell stack 15, a flow field is formed on either side of the bipolar plate, one for $H_2$ and one for $O_2$. Nonconductive gaskets 24 provide seals and electrical insulation between the several components of the fuel cell 10. Insulated bolts (not shown) extend through holes located at the corners of the several components for clamping the fuel cell 10 together.

With particular reference to FIGS. 2 and 3, the MEA 12 includes a membrane 26 sandwiched between an anode catalyst layer 28 and a cathode catalyst layer 30. An anode diffusion media 32a and a cathode diffusion media 32c are interposed between the MEA 12 and the plate 14. As shown, $H_2$ flow channels 20, forming the anode side $H_2$ flow field, lie immediately adjacent the anode diffusion media 32a and are in direct fluid communication therewith. Similarly, $O_2$ flow channels 20, forming the cathode side $O_2$ flow field, lie immediately adjacent the cathode diffusion media 32c and are in direct fluid communication therewith. The membrane 26 is preferably a proton exchange membrane (PEM) and the cell having the PEM is referred to as a PEM fuel cell.

In operation, the $H_2$-containing reformate stream or pure $H_2$ stream (fuel feed stream) flows into an inlet side of the anode side flow field and concurrently, the $O_2$-containing reformate stream (air) or pure $O_2$ stream (oxidant feed stream) flows into an inlet side of the cathode side flow field. $H_2$ flows through anode diffusion media 32a and the presence of the anode catalyst 28 causes the $H_2$ to break into hydrogen ions ($H^+$), with each giving up an electron. The electrons travel from the anode side to an electric circuit (not shown) for enabling work to be performed (i.e. rotation of an electric motor). The membrane layer 26 enables the $H^+$-ion to flow through while preventing electron flow therethrough. Thus, the $H^+$-ions flow directly through the membrane to the cathode catalyst 28. On the cathode side, the $H^+$-ions combine with $O_2$ and the electrons returning from the electric circuit, thereby forming water.

Still referring to FIGS. 2 and 3, flow channels 20 and MEA 12 are shown. Flow channels 20 are sized to have a specific flow area 34 through which the feed streams flow. The flow area 34 is sized so that at a certain flow rate of the feed streams through the flow channels 20, a specific pressure drop occurs across the flow field 22. That is, at a certain flow rate the gaseous reactants flowing through the channels 20 will experience a pressure drop between an inlet and an outlet of the flow field 22. The flow rate of the feed streams through the flow field 22 may vary depending upon the operation of the fuel cell stack 15, such as when higher or lower power output is required. At times, it may be desirable to alter the specific pressure drop that occurs across flow field 22 for a specific flow rate of a feed stream.

To change the pressure drop that occurs across flow field 22 for a specific flow rate of a feed stream, diffusion media 32, as shown in FIGS. 2 and 3, is compressible and can be compressed into flow channels 20 of flow field 22. Specifically, MEA 12 is compressed between adjacent electrode plates 14 so that a portion 36 of compressible media 32 intrudes into flow channels 20. As shown in FIGS. 4A and 4B, fuel cell stack 15 is compressed by an adjustable compressing member 38 that applies a compressive force F which causes the plurality of fuel cells 10 to compress together and causes compressible diffusion media 32 to compress and intrude into flow channels 20 of flow field 22. Preferably, compressible media 32 elastically deforms between about 0-50%. More specifically, a cross-sectional area of compressible media 32 preferably elastically deforms between about 0-50%. The intrusion of portions 36 of diffusion media 32 into flow channels 20 reduces flow area 34. Reduction in flow area 34 restricts flow of a feed stream through flow channel 20 and flow field 22. The restriction causes an increased pressure drop to occur for a given flow rate of the feed stream. The amount of intrusion of media 32 into flow channels 20 is dependent upon a variety of factors, such as the specific characteristics of diffusion media 32, the geometry/dimensions (depth and width) of flow channels 20 and the amount of force F applied. The variable restriction of the flow channels 20 allows for control of a feed stream flowing through flow channel 20.

Diffusion media 32, as was stated above, is used as both an anode diffusion media 32a and a cathode diffusion media 32c. Diffusion media 32 can be compressible or non-compressible at the typical forces F that are applied to fuel stack 15. Typically, fuel cell stack 15 is compressed an amount that causes a pressure in a range between about 25-200 psi to be experienced across a total cross-sectional area of fuel cell stack 15. Because of gaps, voids and spaces in the various components that comprise the fuel cells 10 and the fuel cell stack 15, only about 50% of the total cross-sectional area is typically in contact with other components. Therefore, a typical fuel cell stack 15 is compressed an amount that causes a compressive force or pressure in a range between about 50-400 psi to be experienced by fuel cell stack 15. It should be understood, however, that other compressive forces can be applied and still be within the scope of the present invention. It should also be understood that the terms "compressible" and "non-compressible" as used herein are relative terms that are used to describe the ability of one diffusion media 32 to be compressed and intrude into flow channels 20 at the range of compressive forces expected to be encountered in a fuel cell stack 15, relative to another diffusion media 32 not intruding into flow channels 20 any significant amount at the same range of compressive forces expected to be encountered. A significant amount of intrusion into flow channel 20 is that which allows a flow in the flow channel to be adjusted and controlled as described herein. In other words, non-compressible indicates the media has essentially no discernable or functional effect on the flow through the channel.

As was stated above, diffusion media 32 can be provided in either a compressible form or a non-compressible form, depending upon the application and design specifications for the fuel cell 10. Preferably, only one of the diffusion media 32a or 32c is compressible while the other is non-compressible. By having only one type (anode or cathode) of diffusion media 32 compressible, one set of flow channels 20 can be sized for a specific pressure drop at a given flow rate while the other set of channels 20 have a flow area 34 that will vary with the compression of the fuel cells 10. This in turn allows for the operation of the fuel cell stack 15 to be adjusted to a desired operation, as will be discussed below. It should be appreciated, however, that both diffusion media 32a and 32c can be compressible and still be within the scope of the present invention. It should also be understood that not all of the fuel cells 10 that comprise fuel cell stack 15 need to have a compressible media 32 to be within the scope of the invention. That is, the number of fuel cells 10 that have a compressible media 32 that comprise fuel cell stack 15 can vary depending upon the design of the fuel cell stack 15. Therefore, fuel cell stack 15 can include some fuel cells 10 that do not have a compressible media 32 and still be within the scope of the present invention.

The choice of whether to have a compressible anode diffusion media 32a or a compressible cathode diffusion media 32c will depend upon a desired operation and control of fuel cell stack 15. For example, when the fuel supplied to the fuel cell 10 is an $H_2$-containing reformate stream from a reforming system, it is preferred to adjust flow area 34 in anode flow channels 20 by providing a compressible anode diffusion media 32a. The use of a compressible anode diffusion media 32a enables the amount of reformate fuel flowing through the anode flow channels 20 to be accurately controlled. This is preferred because reformate fuel is typically provided by an onboard reforming system that uses energy produced by the fuel cell system to generate the reformate fuel. Since energy is being expended to produce the reformate fuel, it is preferred to supply only the needed (required) amount of reformate fuel to minimize any waste. The reduction in the amount of reformate fuel in the anode exhaust (waste) allows for more efficient operation of the fuel cell system within which the fuel cells 10 operate. Therefore, when a reformate fuel is used, it is preferred that anode diffusion media 32a be compressible while cathode diffusion media 32c be non-compressible.

In contrast, when the fuel feed stream is $H_2$ from an onboard $H_2$ storage tank, it is preferred to adjust flow area 34 in cathode flow channels 20 by providing a compressible cathode diffusion media 32c. This is preferred because little or no energy is consumed by the fuel cell system to provide the $H_2$ fuel feed stream from the storage tank while energy from the fuel cell system is used to provide the oxidant feed stream in the form of compressor work. By controlling the pressure drop through the cathode flow channels 20 via compressible cathode diffusion media 32c, the use of the compressed oxidant feed stream can be minimized and/or optimized so that energy loss associated with excess compressor work is minimized. Additionally, by controlling the flow through the cathode flow channels 20, it is easier to keep fuel cell stack 15 humidified.

With respect to the performance requirements of diffusion media 32, along with being compressible or non-compressible, diffusion media 32 should be sufficiently electrically conductive, thermally conductive and fluid permeable. The fluid permeability of diffusion media 32 must be high for transporting reactant gas and/or $H_2O$ under lands 18 disposed between flow channels 20, the electrical conductivity must be high to transport electrons over flow channels 20 from lands 18 to MEA 12 and the thermal conductivity must be sufficient to transfer heat to the plate which is then dissipated through coolant in contact with the plate.

Diffusion media 32 enables the diffusion of the reactants (i.e., $H_2$ and $O_2$), as well as the reaction products (i.e., $H_2O$) therethrough. In this manner, the reactants are able to flow from flow channels 20, through diffusion media 32 and into contact with their respective catalysts for enabling the required reaction. As described previously, one product of the reaction is $H_2O$. The redistribution of $H_2O$ across fuel cell 10 is of significant importance to the performance of fuel cell 10. Diffusion media 32 enables the flow of $H_2O$ therethrough, from more hydrated areas to drier areas for homogeneously hydrating fuel cell 10. Further, the flow of electrons is also a significant factor in the performance of fuel cell 10. Inhibited electron flow results in poor performance and inefficiency.

Non-compressible diffusion media having the above stated characteristics, such as 060 TORAY® carbon paper, are known in the art and will not be described further. A compressible media 32 having these characteristics can be made from a variety of materials. For example, a woven carbon paper, such as V3 elat single side diffuser available from E-TEK division of De Nora N.A. of Sommerset, N.J., and CF cloth available from SGL Carbon AG of Wiesbaden, Germany, can be used as a compressible diffusion media. Furthermore, other materials having similar properties to the above mentioned materials can also be employed.

Fuel cell stack 15 can be compressed to provide a specific pressure drop for a desired operating state. The specific pressure drop experienced by a feed stream will vary depending upon a flow rate of the feed steam through flow channels 20. The variation in the pressure drop with the flow rate is approximately linear for the pressure drops and flow rates utilized in a typical fuel cell stack 15. Typical pressure drops are in the range of about 0.1-6.0 psi across the plate. However, other pressure drops can be employed without departing from the scope of the present invention.

The specific pressure drop across fuel cell stack 15 can be adjusted to coincide with a desired operating state of the fuel cell stack 15. When peak power is the most important or critical aspect of operation of fuel cell stack 15, compression of fuel cell stack 15 can be adjusted so that a desired pressure drop across flow fields 22 occur at a specific power output of fuel cell stack 15. To ensure peak power performance, the pressure drop is set while fuel cell stack 15 is operating at a high power level (i.e., 85-100% of peak power), as will be described in more detail below. When efficiency of fuel cell stack 15 is the most important or critical aspect of operation of fuel cell stack 15, compression of fuel cell stack 15 can be adjusted so that a desired pressure drop across flow fields 22 occur at a specific power output of fuel cell stack 15. To ensure peak efficiency, the pressure drop is set while fuel cell stack 15 is operating at a lower power level (i.e., 10-30% of peak power), as will be described in more detail below.

The pressure drop that occurs across flow field 22 can be set so that a minimum velocity of a feed stream flowing through flow fields 22 is maintained. Maintaining a minimum velocity is desirable (especially at low power operation) to ensure that an adequate shear force or dynamic pressure is generated by the feed stream to transport reaction products ($H_2O$) out of the fuel cells 10 to allow the gaseous reactants clear access to catalyst layers 28 and 30. The pressure drop can be adjusted so that at a minimum expected flow rate of a feed stream to fuel cell stack 15, a sufficient velocity is maintained through flow channels 20 such that an adequate shear force or dynamic pressure is generated and maintained.

Compressible diffusion media 32 can be compressed to varying degrees as dictated by the application within which the compressible diffusion media 32 is utilized. It is envisioned that the typical compression will be in the range of about 10 to 50%. However, it should be understood that other amounts of compression can be employed without departing from the scope of the present invention. The actual amount of compression will vary depending upon, among other things, the channel geometry (width and depth of the channels), the desired operation of fuel cell stack 15 (desired pressure drop and/or desired flow velocity), and the specific diffusion media used. Electrode plates 14 may employ an electrically conductive coating that requires compression to effectively conduct electricity. That is, the coatings on electrode plates 14 exhibit contact resistance and are not sufficiently conductive without being compressed. The envisioned 10% minimum compression accounts for variations in the manufacturing and tolerances of the components that comprise fuel cell stack 15 and ensures adequate compression and contact between compressible diffusion media 32 and adjacent electrode plates 14 so that the contact resistance of the electrode plates 14 is less than a nominal value. The compression requirements of such coatings can vary depending upon the exact nature of the coating and the design of the plates 14.

The use of a compressible diffusion media 32 that allows for adjustment to a pressure drop of a feed stream flowing through fuel cell stack 15 enables the pressure drop of a fuel cell stack 15 to be adjusted to match a pressure drop of a different fuel cell stack and/or for a fuel cell stack 15 to be built to a specific pressure drop or range of pressure drop. For example, referring now to FIG. 5, a plurality of fuel cell stacks are shown operating in parallel. A first fuel cell stack 38 is shown operating in parallel with a second fuel cell stack 40 which both operate in parallel with an $n^{th}$ fuel cell stack 42. The fuel cell stacks 38, 40 and 42 operate in parallel such that the fuel cell stacks 38, 40 and 42 all share a feed stream 44 from a common feed stream header 46. Each fuel cell stack 38, 40 and 42 receives respective portions 48, 50 and 52 of feed stream 44. The pressure drops across each of the fuel cell stacks 38, 40 and 42 dictate the flow distribution of the feed stream 44 into portions 48, 50 and 52. That is, the size of portions 48, 50 and 52 received by fuel cell stacks 38, 40 and 42, respectively, are determined by the pressure drops of the individual fuel cell stacks 38, 40 and 42. If the fuel cell stacks 38, 40 and 42 have different pressure drops, then each fuel cell stack 38, 40 and 42 will receive a different size portion 48, 50 and 52 of feed stream 44. The non-uniform flow distribution to fuel cell stacks 38, 40 and 42 may be undesirable.

To compensate for the variations in the pressure drops of the parallel fuel cell stacks 38, 40 and 42, fuel cell systems have taken various approaches. A first approach has been incorporating independent flow metering components that monitor and control the portions 48, 50 and 52 received by the fuel cell stacks 38, 40 and 42 so that each fuel cell stack 38, 40 and 42 each receive an adequate portion 48, 50 and 52 of feed stream 44. A second approach has been to supply fuel cell stacks 38, 40 and 42 with an excessive flow of feed stream 44 so that each fuel cell stack 38, 40 and 42 receives an adequate portion 48, 50 and 52 of feed stream 44. The present invention can compensate for the variations in the pressure drops of the fuel cell stacks 38, 40 and 42 without the necessity of having independent flow metering components or supplying an excessive flow of feed stream 44. The fuel cell stacks 38, 40 and 42 when being built can each be compressed so that a pressure drop experienced across each of the fuel cell stacks 38, 40 and 42 are substantially the same or in a common range of pressure drops. Alternatively, one or more fuel cell stacks 15 can be compressed when built or later have its compression adjusted to have a pressure drop that substantially matches a pressure drop or range of pressure drop of an existing fuel cell stack(s) and then used in parallel with the existing fuel cell stack(s). By balancing the pressure drops across fuel cell stacks 38, 40 and 42, portions 48, 50 and 52 of feed stream 44 are substantially the same (all other influencing factors being equal (e.g., piping restrictions)). Preferably, the pressure drops of each of the fuel cell stacks 38, 40, 42 are adjusted so that they occur at substantially the same power output or power output range.

Referring again to FIG. 4, the assembly and compression of fuel cell stack 15 is shown. A plurality of fuel cells 10 are arranged adjacent one another into a fuel cell assembly 54. Fuel cell assembly 54 is positioned between a pair of terminal plates 56 that are used to conduct electrical current to/from fuel cell assembly 54. A pair of end plates 16 are disposed adjacent terminal plates 56 on either side of fuel cell assembly 54. Compressive force F is applied to one or both end plates 16 to compress fuel cell assembly 54. Reactant feed streams are provided to fuel cell stack 15 and operation of the fuel cell stack 15 is commenced. A power output of fuel cell stack 15 along with the pressure drop of one or both of the feed streams across fuel cell stack 15 are measured and/or monitored. Additionally, a velocity of the feed streams flowing through fuel cell stack 15 can also be measured and/or monitored. The operation of fuel cell stack 15 is adjusted until fuel cell stack 15 is operating at a desired state (e.g., power level).

Compressive force F is then adjusted in magnitude until fuel cell stack 15 exhibits a desired characteristic. For example, compressive force F can be adjusted until the pressure drop across fuel cell stack 15 is of a predetermined magnitude, range of magnitudes, or until a minimum flow velocity of one or more of the feed streams through the fuel cell stack 15 is exceeded. The exact operating state of fuel cell stack 15 at the time of adjusting the compressive force F will vary depending upon the desired operation of fuel cell stack 15. For example, as stated above, when peak power output is critical or most important, fuel cell stack 15 may be operated at 85-100% of peak power level while adjusting the compressive force F. In contrast, when efficiency of fuel cell stack 15 is most important, fuel cell stack 15 is operated at 10-30% of peak power level while adjusting compressive force F.

Once compressive force F (and the associated intrusion of media 32 into flow channel 20) has been adjusted to a level that gives a desired operational characteristic of fuel cell stack 15, end plates 16 are secured to a pair of side plates 60. Compressive force F is then removed. Attachment of end plates 16 to side plates 60 cause end plates 16 to remain at a fixed distance apart and maintain the compression of fuel cell assembly 54. End plates 16 can be secured to side plate 60 in a variety of ways, as is known in the art. For example, mechanical fastener 62 can be used to secure end plates 16 to side plates 60. A more detailed description of the stack compression mechanism illustrated in FIG. 4 is set forth in U.S. application Ser. No. 10/136,781 filed on Apr. 30, 2002, which is commonly owned by the assignee of the present invention and which disclosure is expressly incorporated by reference herein. Alternatively, other means for compressing the fuel cell stack which provides a generally equalized compression load are known in the art and may be employed with the present invention.

While flow channels 20 are shown as being generally rectangular, it should be understood that other shapes and configurations that allow compressible diffusion media 32 to intrude into flow channels 20 and decrease flow area 34, can be utilized without departing from the scope of the present invention. Furthermore, while specific pressure drops and power levels have been used to describe and illustrate the present invention, it should be understood that other pressure drops and other operational conditions of fuel cell stack 15 and/or fuel cells 10 can be utilized without departing from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell comprising:
    a electrode plates each having a flow field formed therein;
    first and second membrane electrode assembly; and
    first and second fluid-permeable diffusion media, said first diffusion media disposed between said first electrode plate and said membrane electrode assembly, and said second diffusion media disposed between said second electrode plate and said membrane electrode assembly,
    wherein said first diffusion media is relatively more compressible than said second diffusion media, and said first and second diffusion media are respectively compressed against said first and second electrode plates with said first diffusion media intruding into said first flow field and said second diffusion media being free of intrusion into said second flow field.

2. The fuel cell of claim 1, wherein said first electrode plate is a cathode plate.

3. The fuel cell of claim 1, wherein said first electrode plate is an anode plate.

4. The fuel cell of claim 1, wherein a predetermined pressure drop occurs across said first flow field at a predetermined power output level.

5. The fuel cell of claim 1, wherein said first diffusion media is compressed against said first electrode plate and a velocity of a feed stream flowing through said first flow field is above a predetermined level.

6. The fuel cell of claim 1, wherein said first diffusion media is compressed against said first electrode plate with at least a 10% reduction in the thickness of said first diffusion media as compared to an uncompressed state.

7. The fuel cell of claim 1, wherein said second diffusion media is non-compressible relative to said first diffusion media.

8. A fuel cell stack comprising:
    a plurality of fuel cells arranged adjacent one another, said plurality of fuel cells each having an electrode plate having a flow field formed therein, a proton exchange membrane electrode assembly and a fluid-permeable diffusion media disposed between said membrane electrode assembly and said electrode plate, at least a first one of said diffusion media being more compressible relative to at least a second one of said diffusion media, said adjacent fuel cells being compressed together with said diffusion media in each of said fuel cells compressed against said electrode plate, a portion of said first one of said diffusion media intruding into said flow field of said adjacent electrode plate, and said second one of said diffusion media not intruding into said flow field of said adjacent electrode plate.

9. The fuel cell stack of claim 8, wherein said first one of said diffusion media is adjacent a cathode electrode plate.

10. The fuel cell stack of claim 8, wherein said first one of said diffusion media is adjacent an anode electrode plate.

11. The fuel cell stack of claim 8, wherein said fuel cells are compressed together and a pressure drop of a predetermined magnitude occurs in a feed stream flowing through said flow fields.

12. The fuel cell stack of claim 11, wherein said predetermined pressure drop is in the range of about 0.1 to about 6 psi.

13. The fuel cell stack of claim 11, wherein said predetermined pressure drop occurs at a predetermined power output.

14. The fuel cell stack of claim 8, wherein said fuel cells are compressed together so that said first one of said diffusion media is compressed against said adjacent electrode plate to cause at least a 10% reduction in the thickness of said first one of said diffusion media as compared to an uncompressed state.

15. The fuel cell stack of claim 8, wherein said second one of said diffusion media is non-compressible relative to said first one of said diffusion media.

16. A fuel cell system comprising:
    first and second fuel cell stacks arranged in parallel with each fuel cell stack having a plurality of fuel cells and receiving a portion of a feed stream, said fuel cells in at least one of said first and second fuel cell stacks comprising:
        a plurality of electrode plates having a flow field formed therein;
        a plurality of membrane electrode assemblies; and
        a plurality of fluid-permeable diffusion media disposed between said membrane electrode assemblies and said electrode plates, at least a first one of said diffusion media being relatively more compressible than a second one of said diffusion media with said first one of said diffusion media being compressed against and intruding into a first one of said flow fields and said second one of said diffusion media being compressed against and free of intrusion into a second one of said flow fields,
    wherein said diffusion media is compressed against said electrode plates with a first pressure drop across said first fuel cell stack substantially the same as a second pressure drop across said second fuel cell stack.

17. The fuel cell system of claim 16, wherein said feed stream is a fuel feed stream and said first one of said electrode plates is an anode plate.

18. The fuel cell system of claim 17, wherein said fuel feed stream is a reformate feed stream.

19. The fuel cell system of claim 16, wherein said feed stream is an $H_2$ feed stream and said first one of said electrode plates is a cathode plate.

20. The fuel cell system of claim 16, wherein said feed stream is an oxidant feed stream and said first one of said electrode plates is a cathode plate.

21. The fuel cell system of claim 16, wherein said first pressure drop is associated with a first power output of said first fuel cell stack and said second pressure drop is associated with a second power output of said second fuel cell stack, and said first and second power outputs are substantially the same.

22. The fuel cell system of claim 16, wherein said diffusion media is compressed against said electrode plates and a velocity of said portion of said feed stream above a predetermined level.

23. The fuel cell system of claim 16, wherein said second one of said diffusion media is non-compressible relative to said first one of said diffusion media.

* * * * *